United States Patent
Shen (10) Patent No.: US 9,656,828 B2
(45) Date of Patent: May 23, 2017

(54) TAPE DISPENSER

(71) Applicant: DAILYLINE CORP., Taoyuan County (TW)

(72) Inventor: Dick Shen, Taoyuan County (TW)

(73) Assignee: Dailyline Corp., Taoyuan, Taoyuan County (TW)

(*) Notice: Subject to any disclaimer, the term of this patent is extended or adjusted under 35 U.S.C. 154(b) by 148 days.

(21) Appl. No.: 14/314,594

(22) Filed: Jun. 25, 2014

(65) Prior Publication Data

US 2015/0375954 A1  Dec. 31, 2015

(51) Int. Cl.
*B65H 35/06* (2006.01)
*B65H 35/00* (2006.01)
*B32B 7/12* (2006.01)

(52) U.S. Cl.
CPC ......... *B65H 35/06* (2013.01); *B65H 35/0026* (2013.01); *B32B 7/12* (2013.01)

(58) Field of Classification Search
CPC ........ B65H 35/0026; B65H 35/06; B32B 7/12
USPC ................. 225/42, 13, 16; 220/359.1–359.3; 428/40.1–42.3, 343; 248/346.01, 467; 7/160
See application file for complete search history.

(56) References Cited

U.S. PATENT DOCUMENTS

| 6,145,722 A * | 11/2000 | Behrens | B65H 35/0026 206/403 |
| 6,651,857 B1 * | 11/2003 | Tsai | B65H 35/0026 206/214 |
| 2014/0151525 A1 * | 6/2014 | Cheng | A45D 42/16 248/467 |

FOREIGN PATENT DOCUMENTS

| TW | 423525 | 2/2001 |
| TW | M276830 | 10/2005 |

\* cited by examiner

*Primary Examiner* — Ghassem Alie
*Assistant Examiner* — Nhat Chieu Do
(74) *Attorney, Agent, or Firm* — Muncy, Geissler, Olds & Lowe, P.C.

(57) ABSTRACT

A tape dispenser that includes a seat and a cover. The seat includes a acting portion for installing and cutting a tape, and a support portion connecting to the acting portion and supporting the acting portion to be placed on a surface. The support portion includes a first pivotal portion and a first adhesion portion for adhering to the surface. The cover is pivotally connected to the support portion, and includes a second pivotal portion pivotally engaged with the first pivotal portion, and a covering portion connected to the second pivotal portion and formed at an area larger than that of the first adhesion portion. The covering portion comprises a first position at which the covering portion covers the first adhesion portion, and a second position at which the covering portion is disengaged from the first adhesion portion to make the first adhesion portion adhere to the surface.

2 Claims, 7 Drawing Sheets

TAPE DISPENSER

FIELD OF THE INVENTION

The present invention relates to a tape dispenser, and more particularly, to a lightweight tape dispenser that is capable of securely fixing to a surface and having easy portability.

BACKGROUND OF THE INVENTION

Tape dispensers are one of the frequently used office supplies in the daily lives. In environments of households, schools or offices, the ease-of-use of tapes is enhanced through tape dispensers to more easily adhere or seal stationeries and other objects. Current tape dispensers are in large divided into two types—handheld and desktop. Handheld tape dispensers usually accommodate large-size tape rolls having a larger width, and are mainly used with the large-size tape rolls for sealing containers. Desktop tape dispensers usually accommodate small-size tape rolls having a smaller width, and are suitable for uses of various stationeries.

Taiwan Patent No. 423525 discloses a handheld tape dispenser having a main body, which is made of a lightweight material and formed by integral injection. When holding the tape dispenser, the main body is held by the palm of one hand while the tape is pulled by other hand, thereby sealing an object. Thus, a user can hold the handheld tape dispenser and apply the tape with ease. Further, Taiwan Patent No. M276830 discloses a tape dispenser capable of holding objects. Weights are included in the tape dispenser to add the overall weight of the tape dispenser to prevent the tape dispenser from sliding when the tape is pulled. Thus, the tape can be pulled out by using only one hand.

A lightweight and easily portable handheld tape dispenser and a heavy tape dispenser that allows the tape to be pulled by one hand are disclosed in the above prior art. However, being lightweight, the handheld tape dispenser cannot be placed on a desk in a way that the tape be pulled by one hand. In contrast, the heavy desktop tape dispenser cannot be handheld by a user to readily apply the tape. Therefore, there is a need for a tape dispenser that can be placed on a desk to allow a user to pull the tape by one hand and at the same time being lightweight and easily portable.

SUMMARY OF THE INVENTION

The primary object of the present invention is to provide a tape dispenser that can be securely attached to a surface while also being lightweight for easy portability.

To achieve the above object, a lightweight tape dispenser is provided by the present invention. The lightweight tape dispenser comprises a seat and a cover pivotally connecting to the seat. The seat comprises a cutting portion for installing and cutting a tape, and a support portion connecting to the cutting portion and supporting the cutting portion to be placed on a surface. The support portion comprises a first pivotal portion, and a first adhesion portion that can be used to adhered to the surface. The cover, pivotally connected to the support portion, comprises a second pivotal portion pivotally engaged with the first pivotal portion, and a covering portion which is connected to the second portion and formed at an area at least larger than that of the first adhesion portion. The covering portion comprises a first position at which the covering portion covers the first adhesion portion, and a second position at which the covering portion is disengaged from the first adhesion portion to make the first adhesion portion adhere to the surface.

In one embodiment of the present invention, the cutting portion comprises a shaft contact portion for enabling the tape to rotate relative to the support portion, and a blade portion capable for cutting the tape.

In one embodiment of the present invention, the cover comprises a latch portion connecting to the covering portion, and the seat comprises a first limiting portion engaged with the latch portion when the cover is at the first position, and a second limiting portion engaged with the latch portion when the cover is at the second position.

In one embodiment of the present invention, the covering portion at the second position comprises a first plane facing the surface, and the first adhesion portion comprises a second plane.

The level of the first plane is equal or higher than that of the second plane.

In one embodiment of the present invention, the cover comprises a gap section located between the second pivotal portion and the first plane of the covering portion.

In one embodiment of the present invention, the support portion comprises an accommodating chamber that recesses towards the cutting portion for accommodating the covering portion at the second position.

To achieve the above object, a lightweight tape dispenser is provided by the present invention. The lightweight tape dispenser comprises a seat and a cover pivotally connecting on the seat. The seat comprises a cutting portion for installing and cutting a tape, and a support portion connecting to the cutting portion and supporting the cutting portion to be placed on a surface. The support portion comprises a first pivotal potion. The cover, pivotally connected to the support portion, comprises a second pivotal portion pivotally engaging with the first pivotal portion, and a covering portion connecting to the second portion. The covering portion comprises a second adhesion portion that can be used to adhere to the surface, and a non-adhesion portion disposed opposite to the second adhesion portion. The covering portion comprises a third position at which the non-adhesion portion faces the surface and the second adhesion portion faces the cutting portion, and a fourth position at which the non-adhesion portion faces the cutting portion and the second adhesion portion faces the surface to be adhere to the surface.

In one embodiment of the present invention, the cover comprises a latch portion connecting to the covering portion, and the seat comprising a first limiting portion engaged with to the latch portion when the cover is at the third position, and a second limiting portion engaged with the latch portion when the cover is at the fourth position.

In one embodiment of the present invention, the cover comprises a gap section located between the second pivotal portion and the non-adhesion portion of the covering portion.

In one embodiment of the present invention, the support portion comprises an accommodating chamber that recesses towards the cutting portion for accommodating the covering portion at the third position.

Compared to the prior art, the lightweight tape dispenser of the present invention offers the features below. The lightweight tape dispenser of the present invention mainly comprises the first adhesion portion or the second adhesion portion and the cover. Accordingly, to secure the lightweight tape dispenser to the surface, the cover is lifted to reveal the first adhesion portion or the second adhesion portion, such that the lightweight tape dispenser can be used to adhere to the surface. To carry the lightweight tape dispenser, it is only required to conceal the first adhesion portion or the second adhesion portion in the lightweight tape dispenser, and coming into contact with the first adhesion portion or the second adhesion portion can be prevented to readily carry the lightweight tape dispenser.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
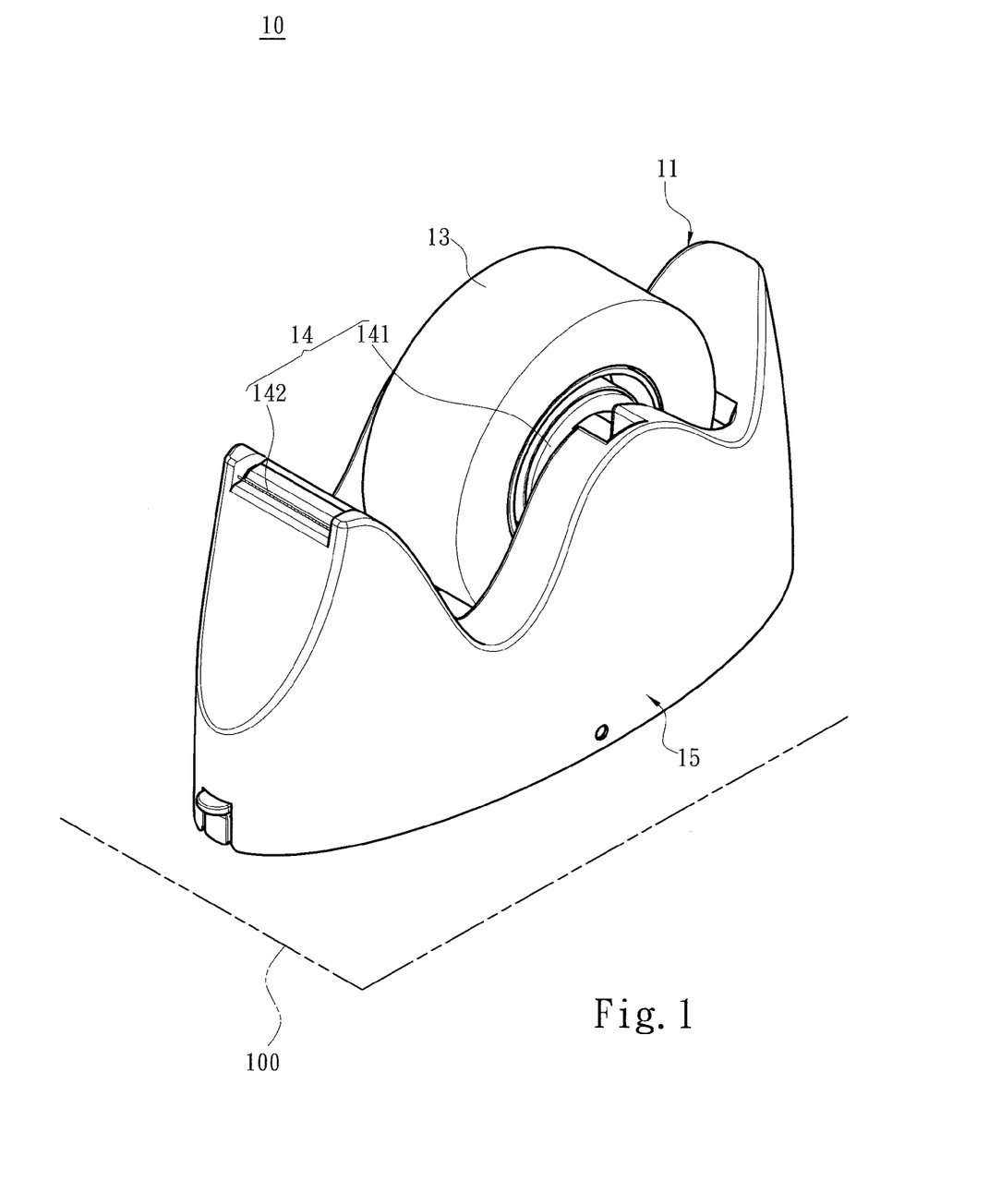
FIG. 1 is a schematic diagram of a lightweight tape dispenser according to a first embodiment of the present invention.
Figure 2:
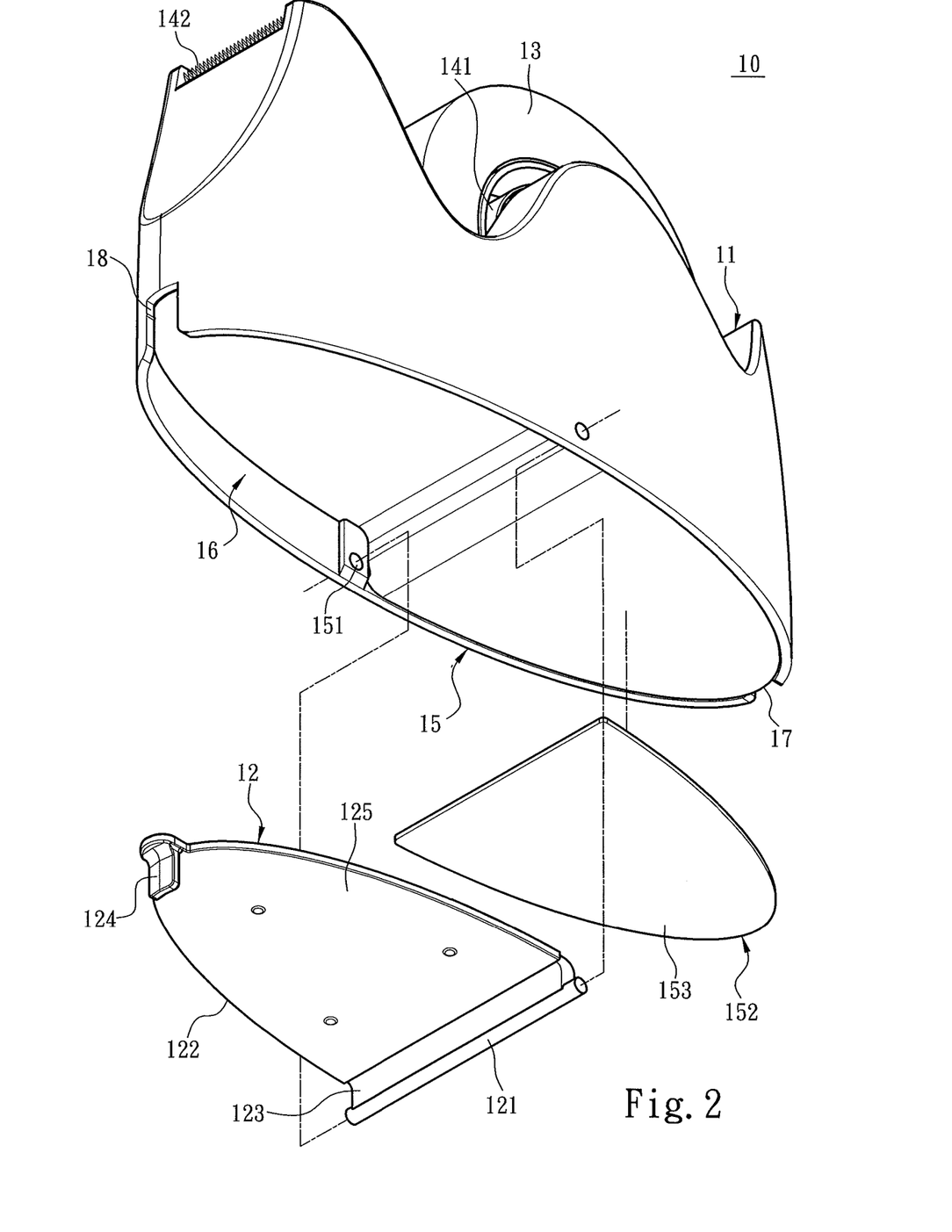
FIG. 2 is an exploded view of a lightweight tape dispenser according to the first embodiment of the present invention.
Figure 4:
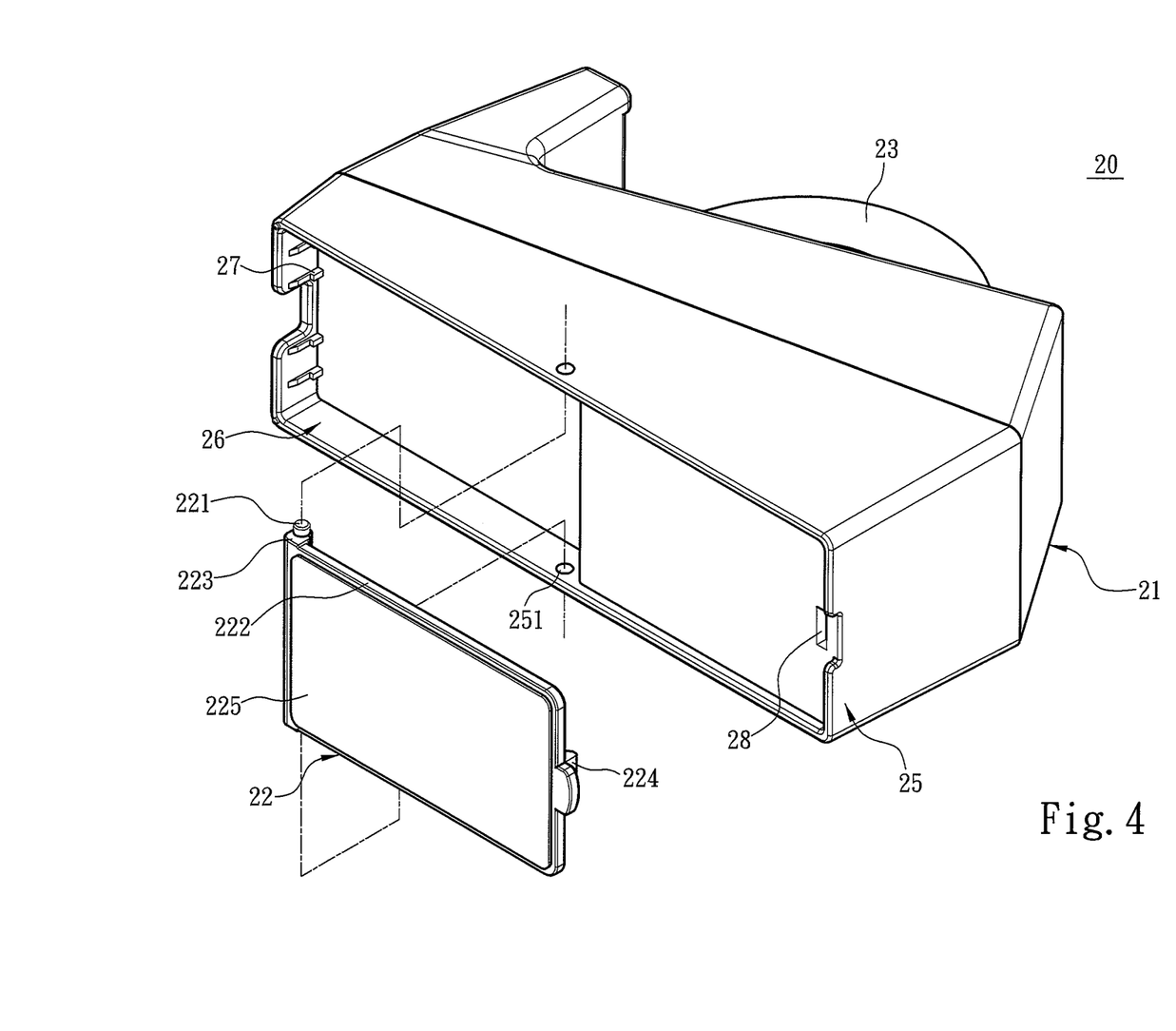
FIG. 4 is a schematic diagram of a lightweight tape dispenser according to a second embodiment of the present invention.
Figure 5A:
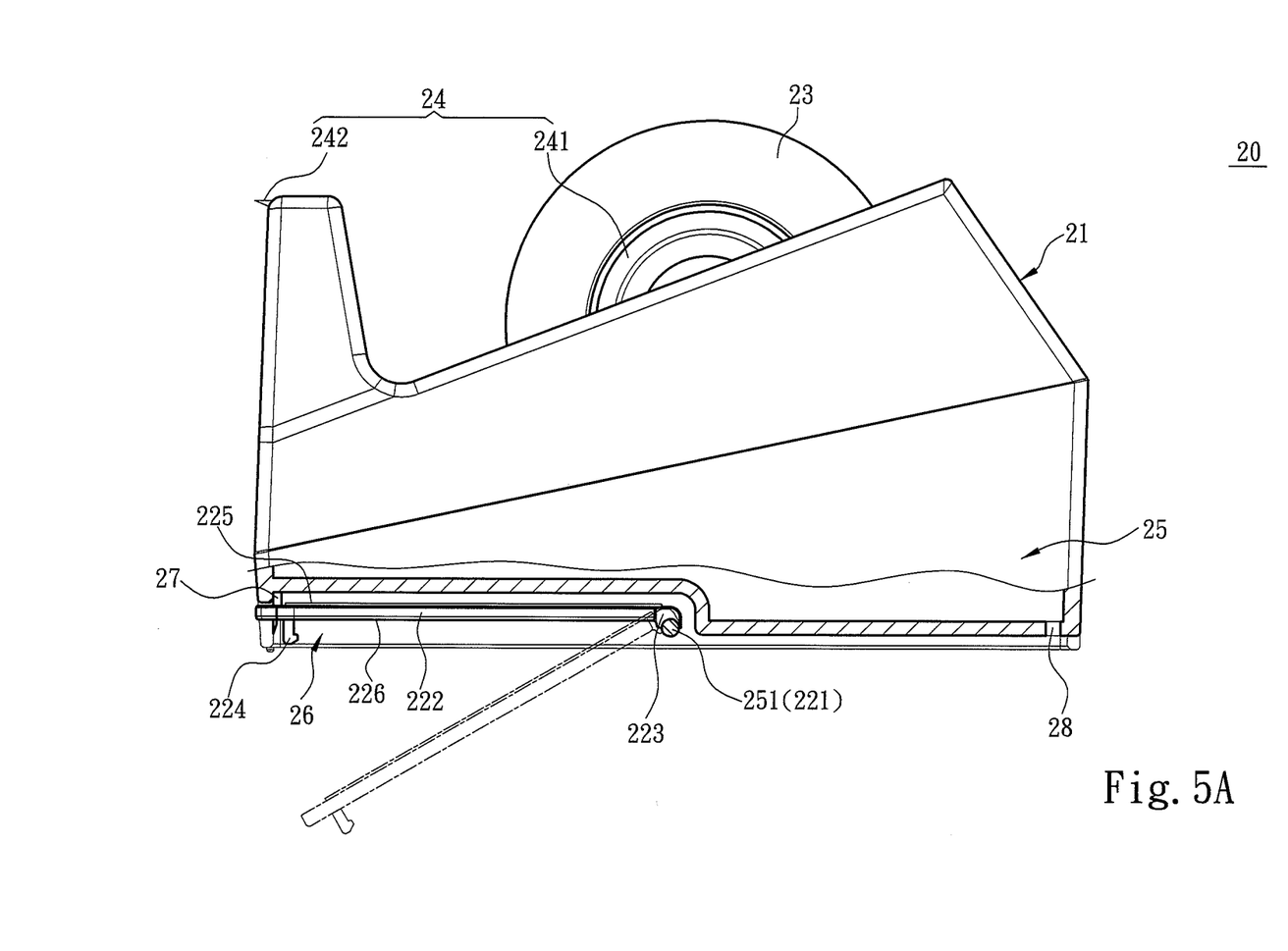
FIG. 5A and FIG. 5B are schematic diagrams of operations of a lightweight tape dispenser according to the second embodiment of the present invention.
Figure 5B:
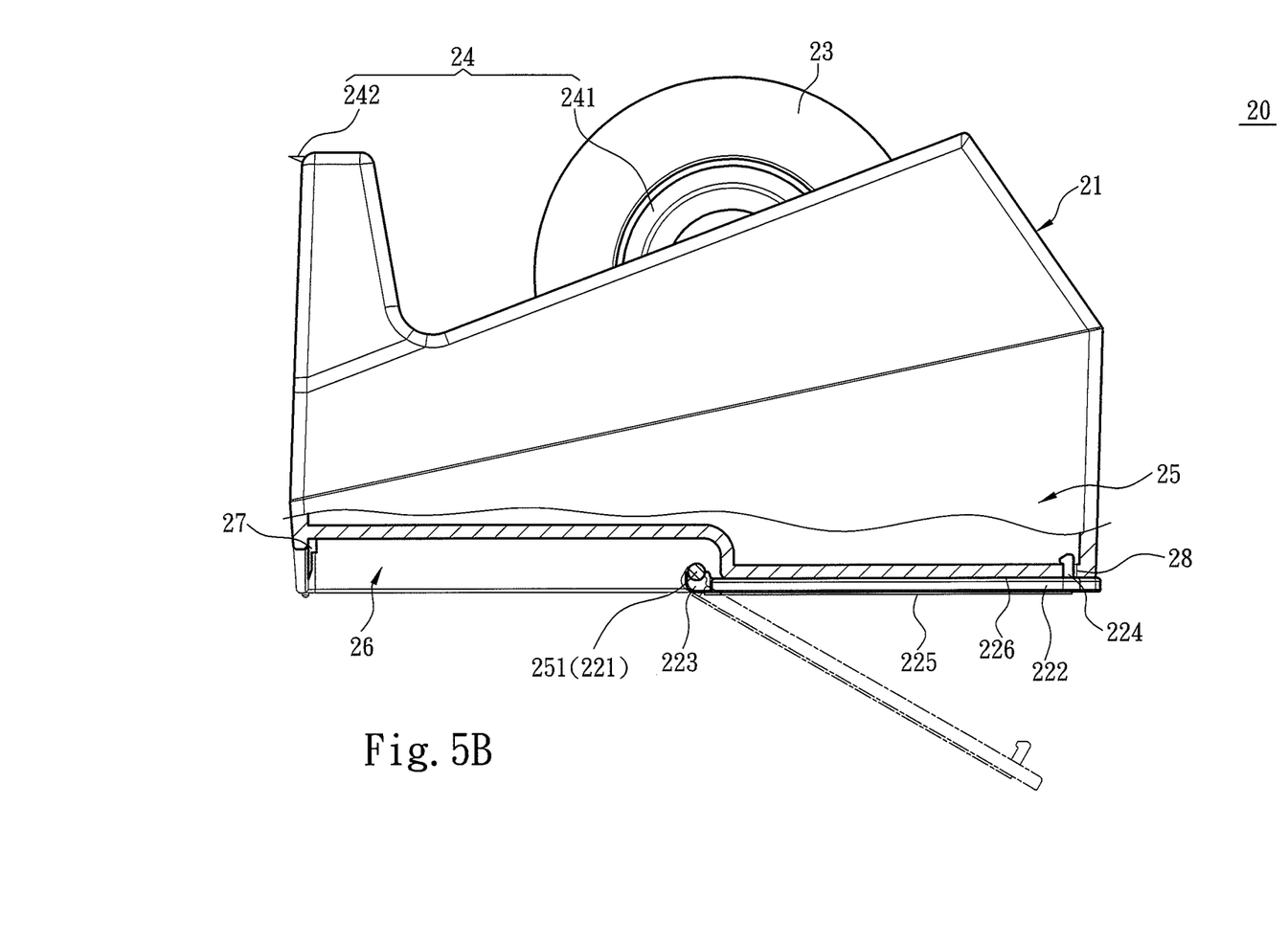

A lightweight tape dispenser is provided according to two embodiments of the present invention. FIG. 1 to FIG. 3B show a tape dispenser according to the first embodiment of the present invention. FIG. 4 to FIG. 5B show a tape dispenser according to the second embodiment of the present invention. Referring to FIG. 1 and FIG. 2, a lightweight tape dispenser 10 according to the first embodiment of the present invention comprises a seat 11 and a cover 12 pivotally connecting to the seat 11. The seat 11 comprises a cutting portion 14 for installing and cutting a tape 13, a support portion 15 connecting to the cutting portion 14 and supporting the cutting portion 14 to be placed on a surface, an accommodating chamber 16 disposed at the support portion 15 and recesses from the cutting portion 14, and a first limiting portion 17 and a second limiting portion 18 disposed at the support portion 15. The cutting portion 14 comprises a shaft contact portion 141 for installing the tape 13 and enabling the tape 13 to rotate relative to the support portion 15, and a blade portion 142 capable of cutting the tape 13. The support portion 15 comprises a first pivotal portion 151, and a first adhesion portion 152 that can be used to adhere to the surface. Further, the cover 12, pivotally connected to the support portion 15, comprises a second pivotal portion 121 pivotally engaged with the first adhesion portion 151, a covering portion 122 which is connected to the second pivotal portion 121 and formed at an area at least larger than that of the first adhesion portion 152, a gap section 123 located between the second pivotal portion 121 and the covering portion 122, and a latch portion 124 connecting to the covering portion 122. To allow the cover 12 to be accommodated in the accommodating chamber 16 without affecting the first adhesion portion 152 that adheres to the surface, the covering portion 122 is defined with a first plane 125, and the gap section 123 is located between the second pivotal portion 121 and the first plane 125 of the covering portion 122. The first adhesion portion 152 further defines a second plane 153. The first plane 125 levels with or is higher than the second plane 153. As such, when the cover 12 is entirely accommodated in the accommodating chamber 16, the first adhesion portion 152 is completely revealed, such that the first adhesion portion 152 is not interfered by the thickness of the cover 12 and is closely adhering to the surface. Regarding the definition of the surface, the surface may be a desktop, a wall surface, or any other position to which the lightweight tape dispenser 10 can be adhered.

Figure 3A:
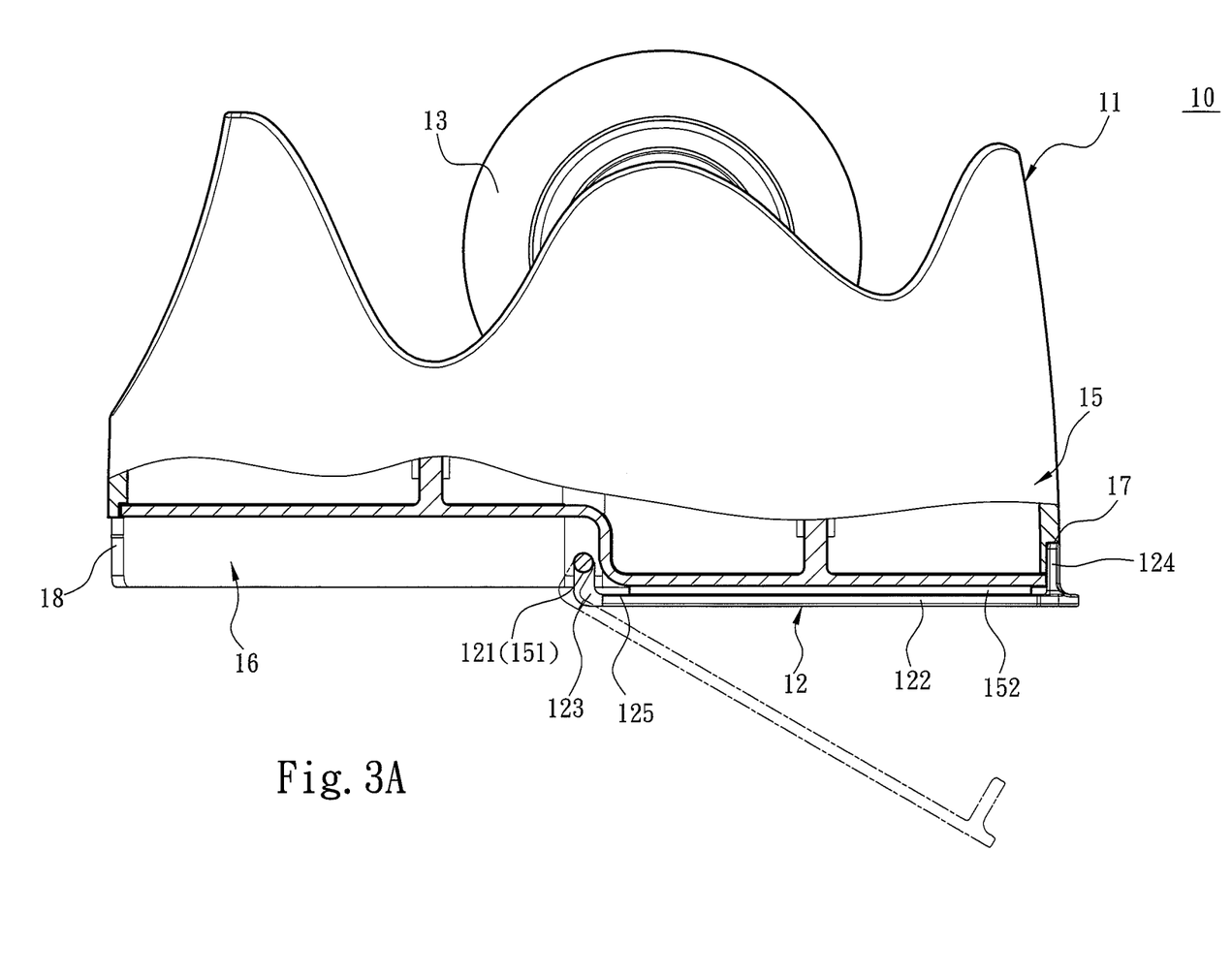
FIG. 3A and FIG. 3B are schematic diagrams of operations of a lightweight tape dispenser according to the first embodiment of the present invention.
Figure 3B:
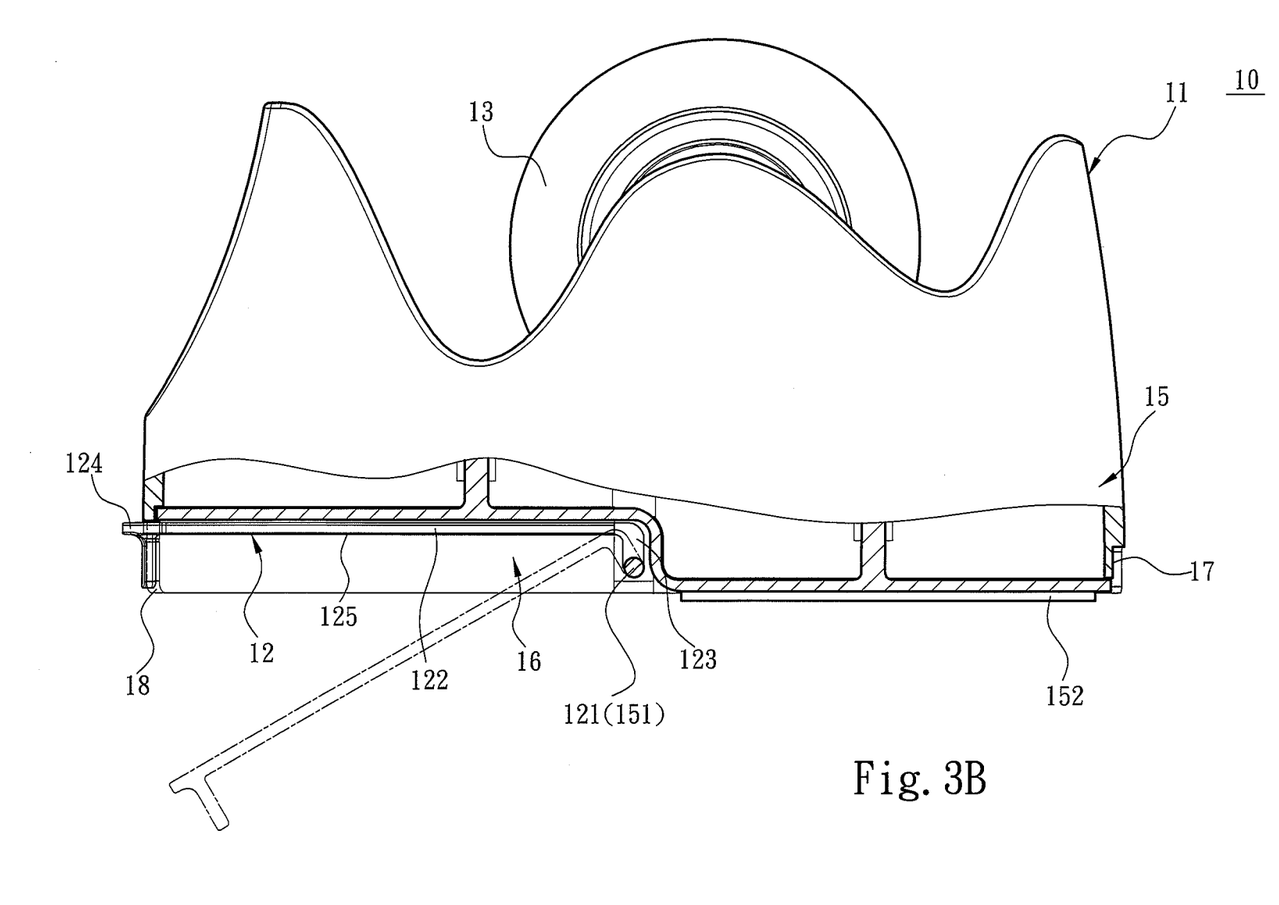

Referring to FIG. 3A and FIG. 3B, the cover 12 is capable of pivotally rotating via the second pivotal portion 121 relative to the first pivotal portion 151 of the support portion 15. Therefore, the relative position of the cover 12 relative to the seat 11 is important. When the first limiting portion 17 of the seat 11 is engaged to the latch portion 124 of the cover 12, the covering portion 122 of the cover 12 covers the first adhesion portion 152, thus concealing the first adhesion portion 152 between the covering portion 122 and the seat 11. At this point, the position at which the covering portion 122 covers the first adhesion portion 152 may be defined as a first position. When the latch portion 124 of the cover 12 departs from the first limiting portion 17 of the seat 11 and becomes engaged to the second limiting portion 18, the covering portion 122 of the cover 12 disengages from the first adhesion portion 152 to render the first plane 125 of the covering portion 122 to face the surface. As such, the first adhesion portion 152 becomes revealed outside the seat 11. At this point, the position at which the covering portion 122 is disengaged from the first adhesion portion 152 may be defined as a second position.

Again referring to FIG. 3A and FIG. 3B, when the user wishes to secure the lightweight tape dispenser 10 to the surface, it is only required to release the latch portion 124 and pivotally rotate the cover 12 to the second position, in a way that the first adhesion portion 152 is revealed outside the seat 11. The first adhesion portion 152 is then adhered to the surface. As such, the user can one-handedly pull and cut the tape 13 without having to assist and secure the lightweight tape dispenser 10 with the other hand. When the user wishes to carry the lightweight tape dispenser 10, to prevent adhering to the first adhesion portion 152, it is only required to release the latch portion 124 and pivotally rotate the cover 12 to the first position, in a way that the first adhesion portion 152 becomes concealed between the covering portion 122 and the seat 11. Thus, the user need not worry about coming into contact with the first adhesion portion 152.

Referring to FIG. 4 to FIG. 5B, a lightweight tape dispenser 20 according to the second embodiment includes a seat 21 and a cover 22 pivotally connecting to the seat 21. The seat 21 comprises a cutting portion 24 for installing and cutting a tape 23, a support portion 25 connecting to the cutting portion 24 and supporting the cutting portion 24 to be placed on a surface, and a first limiting portion 27 and a second limiting portion 28 disposing at the support portion 25. The cutting portion 24 comprises a shaft contact portion 241 for installing the tape 23 and allowing the tape 23 to rotate relative to the support portion 25, and a blade portion 242 capable of cutting the tape 23. The support portion 25 comprises a first pivotal portion 251. Further, the cover 22, pivotally connecting to the support portion 25, comprises a second pivotal portion 221 pivotally engaging with the first pivotal portion 251, a covering portion 222 connecting to the second pivotal portion 221, a gap section 223 located between the second pivotal portion 221 and the covering portion 222, and a latch portion 224 connecting to the covering portion 222. The covering portion 222 comprises a second adhesion portion 225 that can be adhering to the surface, and a non-adhesion portion 226 disposing opposite the second adhesion portion 225. Further, the gap section 223 is located between the second pivotal portion 221 and the non-adhesion portion 226 of the covering portion 222.

Referring to FIG. 5A and FIG. 5B, the cover 22 is capable of pivotally rotating via the second pivotal portion 221 relative to the first pivotal portion 251 of the support portion 25. Therefore, the relative position of the cover 22 relative to the seat 21 is important. When the first limiting portion 27 of the seat 21 is engaged to the latch portion 224 of the cover 22, the non-adhesion portion 226 of the covering portion 222 faces the surface, the second adhesion portion 225 faces the cutting portion 24, and the covering portion 222 is accommodated in the accommodating chamber 26. The position at this point is defined as a third position. When the second limiting portion 28 of the seat 21 is engaged to the latch portion 224 of the cover 22, the non-adhesion portion 226 of the covering portion 222 faces the cutting portion 24 and the second adhesion portion 225 faces the surface. The position at this point is defined as a fourth position.

Again referring to FIG. 5A and FIG. 5B, to secure the lightweight tape dispenser 20 to the surface, it is only required to release the latch portion 224 and pivotally rotate the cover 22 to the fourth position, in a way that the second adhesion portion 225 is revealed outside the seat 21. The second adhesion portion 225 is then adhering to the surface. Thus, the user can one-handedly pull and cut the tape 23 without having to assist and secure the lightweight tape dispenser 20 with the other hand. When the user wishes to carry the lightweight tape dispenser 20, to prevent adhering to the second adhesion portion 225, it is only required to release the latch portion 224 and pivotally rotate the cover 22 to the third position, in a way that the second adhesion portion 225 is located between the non-adhesion portion 226 and the seat 21. Thus, the user need not worry about coming into contact with the second adhesion portion 225.

In conclusion, the lightweight tape dispenser of the present invention mainly comprises the first adhesion portion or the second adhesion portion and the cover. Accordingly, to secure the lightweight tape dispenser to the surface, the cover is lifted to reveal the first adhesion portion or the second adhesion portion such that the lightweight tape dispenser can be adhering to the surface. To carry the lightweight tape dispenser, it is only required to conceal the first adhesion portion or the second adhesion portion in the lightweight tape dispenser, and coming into contact with the first adhesion portion or the second adhesion portion can be prevented to readily carry the lightweight tape dispenser.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A tape dispenser comprising:
   a seat, comprising a shaft portion for installing a tape, a blade portion for cutting the tape and a support portion connecting to the shaft portion and the blade portion for supporting the shaft portion and the blade portion to be placed on a surface, wherein the support portion comprises a first pivotal portion, and the shaft portion enables the tape to rotate relative to the support portion; and
   a cover, pivotally connected to the support portion, comprising a second pivotal portion pivotally engaged with the first pivotal portion, a covering portion connecting to the second pivotal portion, and a latch portion connecting to the covering portion, the covering portion comprising a second adhesion portion that can be used to adhere to the surface, and a non-ahesion portion disposed opposite to the second adhesion portion, the covering portion is on a third position at which the non-adhesion portion faces the surface and the second adhesion portion faces the blade portion, and a fourth position at which the non-adhesion portion faces the blade portion and the second adhesion portion faces the surface to adhere to the surface;
   wherein the seat comprises a first limiting portion engaged with the latch portion when the cover is at the third position, and a second limiting portion engaged with the latch portion when the cover is at the fourth position, the support portion comprises an accommodating chamber that recesses in a direction away from the surface for accommodating the covering portion at the third position, the covering portion switches between the third position and the fourth position through rotating the second pivotal portion and when the fourth position at which the second adhesion portion faces the surface to adhere to the surface, a surface edge facing the surface of the second adhesion portion exceeds a bottom edge of the support portion.

2. The tape dispenser of claim 1, wherein the cover comprises a gap section located between the second pivotal portion and the non-adhesion portion of the covering portion.

* * * * *